(12) United States Patent
Zhou et al.

(10) Patent No.: US 10,981,403 B2
(45) Date of Patent: Apr. 20, 2021

(54) FABRIC PRINT MEDIA

(71) Applicant: Hewlett-Packard Development Company, L.P., Spring, TX (US)

(72) Inventors: Xiaoqi Zhou, San Diego, CA (US); Douglas Knight, San Diego, CA (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/495,848

(22) PCT Filed: Jul. 6, 2017

(86) PCT No.: PCT/US2017/040844
§ 371 (c)(1),
(2) Date: Sep. 20, 2019

(87) PCT Pub. No.: WO2019/009899
PCT Pub. Date: Jan. 10, 2019

(65) Prior Publication Data
US 2020/0047534 A1 Feb. 13, 2020

(51) Int. Cl.
*B41J 3/407* (2006.01)
*B41M 5/50* (2006.01)
(Continued)

(52) U.S. Cl.
CPC ............ *B41M 5/502* (2013.01); *B41J 3/4078* (2013.01); *B41M 5/0011* (2013.01);
(Continued)

(58) Field of Classification Search
CPC .... B41J 3/4078; B41M 5/502; B41M 5/0011; B41M 5/0041; B41M 5/0047;
(Continued)

(56) References Cited

U.S. PATENT DOCUMENTS

| 4,339,491 A | 7/1982 | Lauterbach et al. |
| 5,401,793 A | 3/1995 | Kobayashi et al. |

(Continued)

FOREIGN PATENT DOCUMENTS

| EP | 2890567 | 12/2016 |
| GB | 2156394 | 10/1985 |

(Continued)

OTHER PUBLICATIONS

International Search Report dated Mar. 22, 2018 for PCT/US2017/040844, Applicant Hewlett-Packard Development Company, L.P.

*Primary Examiner* — Jason S Uhlenhake
(74) *Attorney, Agent, or Firm* — Thorpe North & Western LLP (57) ABSTRACT

The present disclosure is drawn to a fabric print medium. The fabric print medium can include a treated fabric base substrate, an adhesion promoting layer, and an image-receiving layer. The treated fabric base substrate can include a fabric base substrate having a water proofing treatment including a water-repellant agent applied thereto. The adhesion promoting layer can be applied to the treated fabric base substrate. The adhesion promoting layer can include a first polymeric binder and a physical networking component. The image-receiving layer can be applied to the adhesion promoting layer. The image-receiving layer can include a second polymeric binder and a particulate filler.

16 Claims, 4 Drawing Sheets

(51) Int. Cl.
*B41M 5/00* (2006.01)
*D06P 5/00* (2006.01)
*D06P 5/30* (2006.01)
*D06N 3/00* (2006.01)
*D06N 3/04* (2006.01)
*D06N 3/10* (2006.01)
*D06N 3/18* (2006.01)

(52) U.S. Cl.
CPC ........ *B41M 5/0041* (2013.01); *B41M 5/0047* (2013.01); *D06N 3/0006* (2013.01); *D06N 3/0059* (2013.01); *D06N 3/042* (2013.01); *D06N 3/10* (2013.01); *D06N 3/186* (2013.01); *D06P 5/002* (2013.01); *D06P 5/30* (2013.01); *D06N 2201/02* (2013.01); *D06N 2209/128* (2013.01)

(58) Field of Classification Search
CPC .... D06N 3/0006; D06N 3/0059; D06N 3/042; D06N 3/10; D06N 3/186; D06P 5/002; D06P 5/30
See application file for complete search history.

(56) References Cited

U.S. PATENT DOCUMENTS

| | | | |
|---|---|---|---|
| 5,508,072 A * | 4/1996 | Andersen | B01F 3/1214 428/34.5 |
| 6,001,137 A | 12/1999 | Alfekri et al. | |
| 6,478,980 B2 | 11/2002 | Nigam | |
| 6,589,633 B1 | 7/2003 | Ino et al. | |
| 6,818,253 B2 | 11/2004 | Kimbrell | |
| 7,008,746 B2 * | 3/2006 | Williams | B41M 5/025 428/200 |
| 7,842,624 B2 | 11/2010 | Hennige et al. | |
| 7,871,947 B2 | 1/2011 | Flack | |
| 8,236,385 B2 | 8/2012 | Yahiaoui et al. | |
| 8,563,100 B1 | 10/2013 | Zhou et al. | |
| 8,846,161 B2 | 9/2014 | Linford et al. | |
| 9,562,319 B2 | 2/2017 | Baker et al. | |
| 2003/0157303 A1 | 8/2003 | Li et al. | |
| 2004/0048542 A1 * | 3/2004 | Thomaschefsky | D04H 1/732 442/389 |
| 2005/0233660 A1 | 10/2005 | Kimbrell et al. | |
| 2005/0245156 A1 | 11/2005 | Cates et al. | |
| 2006/0281849 A1 | 12/2006 | Johnson | |
| 2007/0275617 A1 | 11/2007 | Harris et al. | |
| 2011/0102497 A1 | 5/2011 | Sato et al. | |
| 2013/0209801 A1 | 8/2013 | Coudyser et al. | |
| 2013/0216738 A1 | 8/2013 | Owusu et al. | |
| 2013/0240021 A1 | 9/2013 | Mu et al. | |
| 2013/0280535 A1 | 10/2013 | Maas et al. | |

FOREIGN PATENT DOCUMENTS

| | | |
|---|---|---|
| GB | 2407832 | 5/2005 |
| JP | 2001270230 | 10/2001 |
| JP | 2009107254 | 5/2009 |
| KR | 20040084746 | 10/2004 |
| WO | 2008076101 | 6/2008 |
| WO | 2015009271 | 1/2015 |
| WO | 2015142313 | 9/2015 |
| WO | 2016018360 | 2/2016 |
| WO | 2016200376 | 12/2016 |
| WO | 2017058159 | 4/2017 |
| WO | 2018048463 | 3/2018 |

* cited by examiner

FABRIC PRINT MEDIA

BACKGROUND

Textile printing has various applications including the creation of signs, banners, artwork, apparel, wall coverings, window coverings, upholstery, pillows, blankets, flags, tote bags, etc. It is an evolving area and is becoming a trend in the visual communication market. As the area of textile printing continues to grow, the demand for new fabric print media increases.

DETAILED DESCRIPTION

Digital printing on textiles can be challenging due to the nature of textiles. Some textiles can be highly absorptive resulting in diminished color, and synthetic textiles can be crystalline and can have low ink absorption facilitating color bleed. There can also be challenges associated with the durability of printed images when poor ink interaction occurs between ink and the textile which can result in unwanted roughness and can sometimes leave portions of the fabric unprinted. Additional challenges can also arise because of consumer desires and needs, such as the desire for soft textiles. Other difficulties can include providing good color adherence, good image quality, and flame retardant characteristics.

In one example, the present disclosure is drawn to a fabric print medium. The fabric print medium can include a treated fabric base substrate, an adhesion promoting layer, and an image-receiving layer. The treated fabric base substrate can include a fabric base substrate having a water proofing treatment including a water-repellant agent applied to the fabric base substrate. The adhesion promoting layer can be applied to the treated fabric base substrate and can include a first polymeric binder and a physical networking component. The image-receiving layer can be applied to the adhesion promoting layer and can include a second polymeric binder and a particulate filler.

In one example, the water-repellent agent can include a fluorocarbon polymer, polyacrylate with perfluoro side chain, a polyvinylidene chloride emulsion, a polyolefin emulsion, a poly(ethyl-terephthalate) emulsion, an aqueous wax dispersion, a perfluorooctane sulfonate, a perfluorooctanoic acid, a paraffin wax, paraffin wax plus aluminum salt, paraffin wax plus chromium salt, a fatty acid, a hydrogen siloxane emulsion, or a combination thereof. In another example, the treated fabric base substrate can have a surface energy from 20 mN/m to 55 mN/m at 25° C. In further detail, the adhesion promoting layer can have a solids content from 0.1 wt % to 20 wt % and a viscosity from 5,000 cps to 30,000 cps as measured at 30 rpm. The physical networking component can include an acrylate copolymer, a polyethylene glycol copolymer, a polyurethane copolymer, an isophorone diisocyanate, or a combination thereof. The physical networking component can have a weight average molecular weight from 300,000 Mw to 1,000,000 Mw. In the image-receiving layer, the second polymeric binder can have a weight average molecular weight from 5,000 Mw to 200,000 Mw, for example. Likewise, the particulate filler of the image-receiving layer can include aluminum, aluminum hydroxide, aluminum silicate, alumina, colloidal alumina, barium sulfate, boehmite, psudo-boehmite, calcium, calcium carbonate, calcium silicate, calcium sulfate, clay, diatomite, kaolin, lithopene, magnesium, magnesium carbonate, magnesium hydroxide, magnesium silicate, polystyrene, polymethacrylate, polyacrylate, polyolefin, polyethylene, polypropylene, satin white, silica, amorphous silica, synthetic amorphous silica, colloidal silica, talc, titanium dioxide, zinc, zinc oxide, zinc sulfide, zinc carbonate, zeolite, or a combination thereof.

In still further detail, the image-receiving layer can include a flame retardant component. The flame retardant can include mineral powder, organohalogenated compound, metal and phosphorus containing compound, or a combination thereof. The particulate filler and flame retardant can be present from 1 wt % to 90 wt % in the image receiving layer based on dry weight of the image receiving layer.

In still further detail, the fabric print medium can include a protectant layer applied to the image-receiving layer. The protectant layer can include a first crosslinked polymeric network and a second crosslinked polymeric network. In one example, the first crosslinked polymeric network and the second crosslinked polymeric network in the protectant layer can be different and independently include polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, or a combination thereof. In one example, the protectant layer can further include particulate filler and flame retardant. In a further example, the protectant layer can further include from 1 wt % to 20 wt % of a wax. In one example, the wax can include synthetic wax, petroleum wax, vegetable wax, animal wax, mineral wax, paraffin wax, microcrystalline wax, polyethylene wax, or a combination thereof.

A method of manufacturing a fabric print medium is also provided. In one example, the method can include treating a fabric base substrate with a water proofing treatment to form a treated fabric base substrate, applying an adhesion promoting layer to the treated fabric base substrate, and applying an image-receiving layer to the adhesion promoting layer. The water proofing treatment can include a water-repellant agent. The adhesion promoting layer can include a first polymeric binder and a physical networking. The image-receiving layer can include a second polymeric binder and a particulate filler. In some examples, the method can further include applying a protectant layer to the image receiving layer. The protectant layer can include a first crosslinked polymeric network and a second crosslinked polymeric network. In one example, treating the fabric base substrate with the water proofing treatment can include dipping the fabric base substrate in the water proofing treatment to form a treated fabric base substrate, and rolling the treated fabric base substrate between a pair of rollers having a pressure of 30 psi to 100 psi. In one example, treating the fabric base can further include drying the fabric base substrate in an oven at a temperature from, for example, 150° C. to 180° C.

A method of printing can include obtaining a fabric print medium and applying an ink composition onto the fabric print medium to form a printed image thereon. The fabric print medium can include a treated fabric base substrate having a fabric base substrate and a water proofing treatment applied thereto, an adhesion promoting layer applied to the treated fabric base substrate, and an image-receiving layer applied to the adhesion promoting layer. The adhesion promoting layer can include a first polymeric binder and a physical networking component. The image-receiving layer can include a second polymeric binder and a particulate filler. In one example, the fabric print medium can further include a protectant layer applied to the image receiving layer. The protectant layer can include a first crosslinked polymeric network and a second crosslinked polymeric network.

It is noted that when discussing the fabric print media and methods described herein, each of these discussions can be considered applicable to the other examples, whether or not they are explicitly discussed in the context of that example. Thus, for example, in discussing, an adhesive layer related to a fabric print medium, such disclosure is also relevant to and directly supported in the context of the methods described herein, and vice versa.

Figure 1:
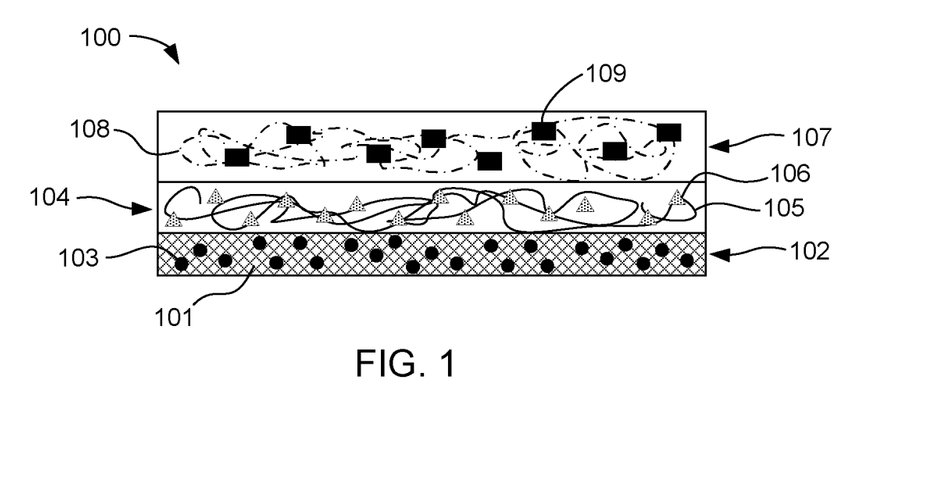
FIG. 1 schematically displays a cross-sectional view of an example fabric print medium in accordance with the present disclosure.

As shown in FIG. 1, a fabric print medium 100 can include a fabric base substrate 101 treated with a water-repellant agent 103 forming a treated fabric base substrate 102. The fabric print medium can also include an adhesion promoting layer 104 and an image-receiving layer 107. The adhesion promoting layer can include a first polymeric binder 105 and a physical networking component 106. The image-receiving layer can include a second polymeric binder 108 and a particulate filler 109.

Turning now to more detail related to the specific components of the fabric print medium, the fabric print medium can include a fabric base substrate. Any textile, cloth, fabric material, fabric clothing, or other fabric product suitable for applying ink can be used. More specifically, fabric substrates can include substrates that have fibers that may be natural and/or synthetic. Thus, the term "fabric" as used herein can include a textile, a cloth, a fabric material, fabric clothing, or another fabric product. The term "fabric structure" is intended to include structures can have warp and weft, and/or can be woven, non-woven, knitted, tufted, crocheted, knotted, and pressured, for example. The terms "warp" and "weft" have their ordinary meaning in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or a mixture of both types of fibers). Fabric substrates can include textiles in their filament form, textiles in the form of fabric material, or textiles in the form of fabric that has been crafted into a finished article (e.g. clothing, blankets, tablecloths, napkins, towels, bedding material, curtains, carpet, handbags, shoes, banners, signs, flags, etc.). In some examples, the fabric base substrate can have a woven, knitted, non-woven, or tufted fabric structure. In one example, the fabric base substrate can be a woven fabric where warp yarns and weft yarns can be mutually positioned at an angle of about 90°. This woven fabric can include but is not limited to, fabric with a plain weave structure, fabric with twill weave structure where the twill weave produces diagonal lines on a face of the fabric, or a satin weave. In another example, the fabric base substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric base substrate can be a non-woven fabric. For example, the non-woven fabric can be a flexible fabric that can include a plurality of fibers or filaments where one or both are bonded together and interlocked together by a chemical treatment process (e.g., a solvent treatment), a mechanical treatment process (e.g., embossing), a thermal treatment process, or a combination of two or more of these processes.

Regardless of the structure, in one example, the fabric base substrate can include natural fibers, synthetic fibers, or a combination thereof. Exemplary natural fibers can include, but are not limited to, wool, cotton, silk, linen, jute, flax, hemp, rayon fibers, thermoplastic aliphatic polymeric fibers derived from renewable resources (e.g. cornstarch, tapioca products, sugarcanes), or a combination thereof. In another example, the fabric base substrate can include synthetic fibers. Exemplary synthetic fibers can include polymeric fibers such as, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®)(both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the synthetic fiber can be a modified fiber from the above-listed polymers. The term "modified fiber" refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation. The term "PVC-free fibers" as used herein means that no polyvinyl chloride (PVC) polymer or vinyl chloride monomer units are in the fibers.

As previously mentioned, the fabric substrate can be a combination of fiber types, e.g. a combination of any natural fiber with another natural fiber, any natural fiber with a synthetic fiber, a synthetic fiber with another synthetic fiber, or mixtures of multiple types of natural fibers and/or synthetic fibers in any of the above combinations. In some examples, the fabric base substrate can include natural fiber and synthetic fiber. The amount of each fiber type can vary. For example, the amount of the natural fiber can vary from about 5 wt % to about 95 wt % and the amount of synthetic fiber can range from about 5 wt % to 95 wt %. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise the ratio of natural fiber to synthetic fiber in the fabric base substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the fabric base substrate can have a basis weight ranging from about 10 gsm to about 500 gsm. In another example, the fabric base substrate can have a basis weight ranging from about 50 gsm to about 400 gsm. In other examples, the fabric base substrate can have a basis weight ranging from about 100 gsm to about 300 gsm, from about 75 gsm to about 250 gsm, from about 125 gsm to about 300 gsm, or from about 150 gsm to about 350 gsm.

In addition the fabric base substrate can contain additives including, but not limited to, one or more of colorant (e.g., pigments, dyes, and tints), antistatic agents, brightening agents, nucleating agents, antioxidants, UV stabilizers, fillers and lubricants, for example. Alternatively, the fabric base substrate may be pre-treated in a solution containing the substances listed above before applying other treatments or coating layers.

The fabric base substrate can be treated with a water proofing treatment to form a treated fabric base substrate. Without being bounded by any theory, it is believed that the water proofing treatment can help prevent the adhesion promoting layer, the image-receiving layer and/or the protectant layer (if present) from penetrating through the open holes in the fabric base substrate and subsequently contaminating the backside of the fabric base substrate. Backside contaminants can transfer onto the front side of a rolled substrate and can destroy the coating quality of rolled fabric substrates. It is also believed that the waterproofing treatment can prevent the "de-watering" effect that could happen during manufacture. Dewatering can be due to the "open structure" of a fabric substrate that can allow for coating compositions to be lost by penetrating through the fabric base substrate when a coating composition is applied.

In one example, the water proofing treatment can include a water-repellant agent. The water-repellant agent can include a fluorocarbon polymer, e.g., having a C1 to C6 fluorinated saturated chain grafted on a polymeric acrylic backbone. Other water-repellant agents can include a polyvinylidene chloride emulsion, a polyolefin emulsion, a poly (ethyl-terephthalate) emulsion, an aqueous wax dispersion, a perfluorooctane sulfonate, a perfluorooctanoic acid, a paraffin (chain or emulsion), a fatty acid, a hydrogen siloxane emulsion, or a combination thereof. Exemplary commercially available water-repellant agents can include, but are not limited to, Baygard® WRS, Baygard® WRC, (Tanatex Chemicals, Netherlands) and Ecorepel® (Schoeller® Textile AG, Switzerland). These long chain hydrocarbons are fluorine free paraffin chains that can wrap around individual fibers in the fabric base substrate. The water-repellant agent can reduce the surface tension of the fabric base substrate such that water and other aqueous solvents form droplets on the surface of the treated fabric base substrate and roll off.

The interaction of the water-repellant agent with the fabric base substrate can vary depending on the substrate and the water-repellant agent. For example, water-repellant agents like paraffin emulsions can be mechanically incorporated in the fibers, lay on the surface of the fibers, or fill in the pores and/or spaces between fibers that compose the fabric base substrate. Water-repellant agents that are fatty acids can react with the fibers in the fabric base substrate to form chemical bonds. Water-repellant agents, like fluorocarbon polymers can physically coat the surface of the fibers that compose the fabric base substrate.

Regardless of the water-repellant agent used, the fabric substrate of the water-repellant agent can control the surface energy ($\gamma$) of the fabric base substrate. In one example, the treated fabric base substrate can have a surface energy from about 20 millinewton per meter (mN/m) to about 55 mN/m at 25° C. In another example, the treated fabric base substrate can have a surface energy from about 30 mN/m to about 55 mN/m at 25° C. In another example, the treated fabric base substrate can have a surface energy from about 34 mN/m to about 47 mN/m at 25° C. In other examples, the treated fabric base substrate can have a surface energy from about 35 mN/m to about 45 mN/m, from about 40 mN/m to about 45 mN/m, from about 30 mN/m to about 50 mN/m, from about 40 mN/m to about 50 mN/m, or from about 30 mN/m to about 40 mN/m at 25° C. The surface energy ($\gamma$) can be measured by a Force Tensiometer (such as K11 by Krüss, North Carolina).

The amount of water-repellant agent applied to the fabric base substrate can vary. However, in one example, the water-repellant agent can be applied by dipping the fabric substrate inside the solution of water-repellant agent with a concentration of about 3 grams per liter (g/L) to about 50 g/L. In other examples, the water-repellant agent can be applied at from about 5 g/L to about 45 g/L, from about 5 g/L to about 40 g/L, from about 10 g/L to about 30 g/L, from about 15 g/L to about 35 g/L, from about 3 g/L to about 35 g/L, from about 10 g/L to about 25 g/L, or from about 15 g/L to about 50 g/L. In one specific example, the water repellant agent can be added at greater than 10 g/L to less than 40 g/L.

Turning now to the adhesion promoting layer 104, as shown in FIG. 1, the adhesion promoting layer can be applied to the treated fabric base substrate 102 and can include a first polymeric binder 105 and a physical networking component 106. In one example, the adhesion promoting layer can be applied to the treated fabric base substrate at a dry coat weight ranging from about 0.05 gsm to about 5 gsm. In other examples, the adhesion promoting layer can be applied at a dry coat weight ranging from about 0.5 gsm to about 1.5 gsm, from about 0.1 gsm to about 3 gsm, from about 0.05 gsm to about 2 gsm, from about 2 gsm to about 5 gsm, or from about 1 gsm to about 3 gsm. The adhesion promoting layer can be applied to either one side of the treated fabric base substrate or both sides of the treated fabric base substrate.

The first polymeric binder can be any polymer that has good adhesion to the water-repellant agent fabric base substrate. In one example, the first polymeric binder can be a water soluble or water dispersible polymer and can include acrylic acid, acrylic emulsion, acrylic-polyurethane, acrylic polymer latex, acrylamide, acrylonitrile, butadiene, acrylonitrile-butadiene, acrylonitrile-butadiene latex, casein, cellulose, carboxy-methyl cellulose, dimethylaminoethyl methacrylate, ethyl acrylate, ethylene, ethylene-vinyl acetate, gelatin, hydroxyethyl acrylate, hydroxyethyl cellulose, hydroxyethyl methacrylate, maleic anhydride, methyl acrylate, methyl methacrylate, methyl vinylether, methyl vinylketone, methacrylamide, polyacrylates, polyacrylic acid, poly(ethylene oxide), polyester, polyester emulsion, polyester resin, polyvinyl acetate, polyvinyl alcohol, cationic polyvinyl alcohol, aceto-acetylated polyvinyl alcohol, silyl-modified polyvinyl alcohol, polyvinyl amine, polyvinyl pyrrolidone, polystyrene, polymethacrylate, polyacrylic ester, polymethacrylic ester, polyurethane, polyurethane resin, polyacrylamide, starch, sodium vinylsulfonate, styrene, styrene-butadiene, styrene-butadiene emulsion, styrene butadiene rubber, soy protein, vinyl acetate, vinyl acetate latex, vinylamide, vinyl caprolactam, vinyl chloride, vinylidene chloride, vinylidene chloride latex, vinylimidazole, vinyl acrylic, vinyl pyrrolidone, vinyl pryridine, vinyl propionate, or a combination thereof.

In another example, the first polymeric binder can be a water soluble polymer, such as polyvinyl alcohol, starch, gelatin, cellulose, or polyacrylamide. In yet another example, the first polymeric binder can be a water dispersible polymer such as a polymer selected from acrylic polymers or copolymers, vinyl acetate latex, polyesters, vinylidene chloride latex, styrene-butadiene copolymer, acrylonitrile-butadiene copolymer, or combinations thereof. In yet another example, the first polymeric binder can be a styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, or a combination thereof. In some examples, the first polymeric binder can be acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, or a combination thereof. In a further example, the polymer can include an acrylonitrile-butadiene latex.

In further examples, the first polymeric binder can be a latex containing particles of vinyl acetate-based polymer, an acrylic polymer, a styrene polymer, a styrene-butadiene rubber polymer, a polyester polymer, a vinyl chloride polymer, or the like. In other examples, the polymer can be a polymer or a copolymer of acrylic polymers, vinyl-acrylic copolymers, acrylic-polyurethane copolymers or a combination thereof. Exemplary polymers can be polyvinyl alcohol, vinylpyrrolidone, a copolymer of vinylpyrrolidone copolymerized with monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, methyl vinylketone, and the like. In yet a further example, the water soluble polymer can include polyvinyl alcohol, copolymers of polyvinyl alcohol and poly(ethylene oxide), copolymers of polyvinyl alcohol and polyvinylamine, cationic polyvinyl alcohols, aceto-acetylated polyvinyl alcohols, polyvinyl acetates, polyvinyl pyrrolidones, copolymers of polyvinyl pyrrolidone and polyvinyl acetate, gelatin, silyl-modified polyvinyl alcohol, styrene-butadiene copolymer, acrylic polymer latex, ethylene-vinyl acetate copolymer, polyurethane resin, polyester resin, or a combination thereof. Exemplary commercially available first polymeric binders can include Poval™ 235, Mowiol® 56-88, and Mowiol® 40-88 (all available from Kuraray® Co. Ltd, Japan).

The first polymeric binder can have a weight average molecular weight (Mw) of about 5,000 MW to about 200,000 MW. In another example, the weight average molecular weight of the first polymeric binder can be from about 10,000 Mw to about 200,000 Mw. In yet another example, the weight average molecular weight of the first polymeric binder can be from about 20,000 Mw to about 100,000 Mw. In a further example, the average molecular weight of the first polymeric binder can be from about 100,000 Mw to about 200,000 Mw.

The adhesion promoting layer can further incorporate a physical networking component. The physical networking component can be a chemical that promotes physical bonding with the first polymeric binder to form a gel-like solution. A "gel-like solution" can have a low solids content (from about 0.1 wt % to about 30 wt %) and a high viscosity (>15,000 cps) at low shear stress (30 rpm) when measured by a Brookfield viscometer (Brookfield AMETEK, Massachusetts) at 25° C. A gel-like solution can behave like a non-flowable, semi solid gel, but is able to de-bond at higher shear forces, e.g., 100 rpms or greater, to yield a low viscosity fluid, e.g., less than 5,000 cps. In one example, the adhesion promoting layer can have a solid content from 0.1 wt % to 20 wt % and a viscosity from 5,000 cps to 30,000 cps as measured at 30 rpm. In another example, the adhesion promoting layer can have a solid content from 5 wt % to 30 wt % and a viscosity from 3,000 cps to 15,000 cps as measured at 30 rpm.

In some examples, the adhesion promoting layer can have thixotropic behavior. As used herein, "thixotropic behavior" refers to fluids that are non-Newtonian fluids, i.e. which can show a shear stress-dependent change in viscosity. The term "non-Newtonian" refers herein to fluid having a viscosity that is dependent on an applied force such as shear or thermal forces. For example, shear thinning fluids decrease in viscosity with increasing rate of shear. The stronger the thixotropic characteristic of the chemical fluid of the water barrier layer when it undergoes shear stress, the lower the viscosity of the chemical fluid. When the shear stress is removed or reduced, the viscosity can be re-built up. Without being limited to any theory, it is believed that such thixotropic behavior reduces the penetration of the composition into the fabric substrate and helps retain the composition at the top surface of the substrate. The fluid becomes thin under shear force when applied by a coating application head (such as a blade coating head). When the fluid is deposited (the nip of the blade and shear force are removed), the viscosity of fluid can be quickly re-built up and the fluid can remain at the top surface of the treated fabric substrate.

In one example, the physical networking component can be a copolymer of acrylates, such as a copolymer of methacrylic acid and ethyl acrylate ester; a copolymer having with an acrylate based polyelectrolyte backbone and a weight average molecular weight from about 300,000 Mw to about 1,000,000 Mw; a copolymer having a polyester backbone and a weight average molecular weight from about 300,000 Mw to about 1,000,000 Mw; a copolymer having a polyurethane backbone and a weight average molecular weight from about 300,000 Mw to about 1,000,000 Mw; or a combination thereof. In one example, the physical networking component can include an acrylate copolymer, a polyethylene glycol copolymer, a polyurethane copolymer, an isophorone diisocyanate, or a combination thereof and the physical networking component can have a weight average molecular weight from 300,000 Mw to 1,000,000 Mw.

Exemplary commercially available copolymers of acrylates can include, but are not limited to, Acusol™ 810A, Acusol™ 830, Acusol™ 835, Acusol™ 842, (Rohm and Haas/The Dow Chemical Co., Pennsylvania), Alcogum® L 11, Alcogum® L 12, Alcogum® L 51, Alcogum® L 31, Alcogum® L 52, (AkzoNobel Co., Chicago) and the like. Exemplary copolymers with acrylate based polyelectrolyte backbone can include acrylic copolymers pendant with hydrophobic groups in addition to acid groups in backbone distributed throughout the polymer chain. Commercially available acrylic copolymer emulsions examples can include Texicryl® 13-317, Texicryl® 13-313, Texicryl® 13-308, and Texicryl® 13-312 (Scott Bader Commonwealth Ltd., United Kingdom).

In one example, the physical networking component can be a copolymer with polyester backbone, having a weight average molecular weight from about 300,000 Mw to about 1,000,000 Mw. Exemplary copolymers can include polyethylene glycol copolymers, grafted pendant with hydrophobic groups and polar groups in the backbone distributed throughout the polymeric chain. A commercially available example includes Rheovis® PE (BASF Corp., North America).

In yet another example, the physical networking component can be a polyurethane copolymer having a polyurethane backbone. Exemplary polymers can include polyethylene glycol and isophorone diisocyanate, which can include end-capping with an alkanol which can also be distributed throughout the polymer chain. Commercially available examples can include Acusol™ 880 and Acusol™ 882 (Rohm and Haas/The Dow Chemical Co. Pennsylvania).

Next, an image-receiving layer 107 can be applied to the adhesion promoting layer. The image-receiving layer can include a second polymeric binder 108 and a particulate filler 109, as also shown in FIG. 1. The particulate filler may or may not be flame retardant, e.g., a flame retardant powder. Thus, when describing a particulate filler hereinafter, it is understood that the particulate filler may or may not be flame retardant. In some examples, this layer can include voids for receiving ink. In other examples, the image-receiving layer can further include other additives. For example, the image-receiving layer can include an additional flame retardant such as powder or liquid flame retardant, optical brightener, dyes for color hue, surfactant for wettability, processing control agent such as deformer, PH control base/acid buffer, carriers, etc.

Turning specifically to the second polymeric binder, the second polymeric binder can provide a binding function among particulate filler 109 and binding function between coating layer to fabric substrate with adhesion promotion layer, and form a continuous layer (with or without voids). In other examples, the polymeric binder can provide blocking functions to prevent printing ink from penetrating into the z-direction of the fabric base substrate so that a high ink volume is kept on the surface of the printing media in order to contribute to a vivid image. In one example, the second polymeric binder can include acrylonitrile butadiene latex, acrylic emulsion, acrylic urethane, alkyl epoxy resin, carboxy-methyl cellulose, casein, epoxy, gelatin, hydroxyethyl cellulose, novolac resin, polyvinyl pyrroilidene, polyvinyl alcohol, polyacrylate, polyurethane, polyurethane-acrylic, polyether polyurethane, polyester polyurethane, polyester emulsion, polycaprolactam polyurethane, polyether polyurethane, polyglycidyl resin, polyoxirane resin, polyamine, polystyrene-butadiene emulsion, starch, cationized starch, oxidized starch, esterified starch, enzymatically denatured starch, soy protein polymer, soybean protein, styrene butadiene emulsions, styrene maleic anhydride, vinyl-urethane, vinyl acetate emulsion, vinylidene chloride emulsion, or a combination thereof. In other examples, the second polymeric binder can include starch and the starch can be an oxidized starch, cationized starch, esterified starch, enzymatically denatured starch, or combinations thereof. In another example, the second polymeric binder can be a soybean protein. In yet another example, the second polymeric binder can include polyvinyl alcohol. Exemplary commercially available polyvinyl alcohols can include Poval® 235, Mowiol® 6-98, Mowiol® 40-88, and Mowiol® 20-98 (all available from Kuraray® Co. Ltd, Japan). In a further example, the second polymeric binder can include an acrylonitrile-butadiene latex. In yet a further example, the second polymeric binder can include polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsions, or a combination thereof. In some examples, the second polymeric binder can be a self-crosslinking aqueous acrylic emulsion, such as Edolan® AB (Tanatex Chemicals B.V., Netherlands) which has a solids content of 45 wt % and Tg of −18° C.

The weight average molecular weight of the second polymeric binder can vary. In one example, the weight average molecular weight of the second polymeric binder can range from about 5,000 Mw to about 200,000 Mw. In other examples, the weight average molecular weight can be from about 10,000 Mw to about 200,000 Mw, from about 20,000 Mw to about 100,000 Mw, from about 100,000 Mw to about 200,000 Mw, or from about 50,000 Mw to about 150,000 Mw.

The glass transition temperature of the second polymeric binder can also vary. In one example, the glass transition temperature of the second polymeric binder can be from about −40° C. to about 25° C. In other examples, the glass transition temperature of the second polymeric binder can be from about −15° C. to about 18° C., from about −10° C. to about 20° C., from about −5° C. to about 15° C., or from about 0° C. to about 25° C. That being said, when multiple second polymeric binders are present in the image-receiving layer, a portion of the polymeric binder can have a glass transition temperature higher than 25° C. or lower than −40° C.; however, that portion can be limited to less than about 45 wt % of the total weight of the second polymeric binder.

In some examples, the second polymeric binder can be cross-linked. A crossed-linked polymeric binder can refer to a single polymeric substance or multiple polymeric substances with reactive functional groups that can form bonds between a molecular chain structure of the polymeric binder and/or a cross-linker. In some examples, the second polymeric binder can be a self-crosslinking polymeric binder. Self-crosslinking polymeric binders can include different reactive functional groups that can react with each other and bind to one another. In some examples, the interaction can form between the molecular chain structures, can be at a location of a cross-linker, or can form between two functional groups. A cross-linked second polymeric binder can balance softness and mechanical strength in the image-receiving layer.

The second polymeric binder can be present in the image-receiving layer in an amount ranging from about 5 wt % to about 98 wt %. In other examples, the second polymeric binder can be present in the image-receiving layer at from about 5 wt % to about 70 wt %, at from 10 wt % to about 60 wt %, at from about 20 wt % to about 55 wt %, at from about 25 wt % to about 50 wt %.

The image-receiving layer can further include a particulate filler. The particulate filler can be an inorganic powder, inorganic mineral powder, organic powder, or a combination thereof. In one specific example, the particulate filler can be an inorganic particulate filler. General examples of particulate fillers can include aluminum, aluminum hydroxide, aluminum silicate, alumina, colloidal alumina, barium sulfate, boehmite, psudo-boehmite, boron, polymeric brominated compound, calcium, calcium carbonate, calcium silicate, calcium sulfate, clay, diatomite, huntite, hydromangesite, kaolin, lithopone, magnesium, magnesium carbonate, magnesium hydroxide, magnesium silicate, organohalogenated compounds, phosphorus, red phosphorus, polystyrene, polymethacrylate, polyacrylate, polyolefin, polyethylene, polypropylene, satin white, silica, amorphous silica, synthetic amorphous silica, colloidal silica, talc, titanium dioxide, zinc, zinc oxide, zinc sulfide, zinc carbonate, zeolite, or a combination thereof. In one specific example, the particulate filler can include calcium carbonate. The calcium carbonate can be in the form of ground calcium carbonate, precipitated calcium carbonate, modified forms thereof, or combinations thereof. In another example, the particulate filler can include calcium carbonate and clay.

In some examples, the particulate filler can provide flame retardant properties, or in addition to the particulate filer, a separate flame retardant component can be included. Thus, the particulate filler can be flame retardant. If it is not flame retardant, another flame retardant component can be added in addition to the particulate filler. Thus, the description of the "particulate filler" herein refers to certain fillers that are both flame retardant and non-flame retardant. To the extent that the particulate filler is flame retardant, it can be applicable to the "flame retardant component" described in further detail elsewhere herein. In further detail, a "flame retardant" or "flame retardant component" as used herein is meant to include any substance that inhibits, reduces, or delays flammability of media containing the flame retardant component material. These materials are typically added as a particulate filler, or as a secondary particulate filler. Thus, the particulate filler can have flame retardant properties or a flame retardant component that can be included in the image-receiving layer in addition to the particulate filler. Exemplary particulate fillers that may also exhibit flame retardant properties (or which may be used separately as flame retardants) include organohalogenated compounds such as polymeric brominated compounds, halogen containing compounds, mineral compounds, metal oxides, phosphorus containing compounds, organophosphates, nitrogen containing compounds, or a combination thereof. In some examples, a combination of particulate fillers can include a metal oxide and a phosphorus containing compound, or a phosphorus containing compound and a halogen containing compound. In another example, a combination of a phosphorus containing compound, a nitrogen containing compound, and/or a halogen can be used. In one example, the particulate filler and/or flame retardant component can include a mineral powder, an organohalogenated compound, a metal and phosphorus containing compound, a phosphorus containing compound, a nitrogen containing compound, a halogen, an organophosphate, or combination thereof.

Organohalogenated compounds that can be used as particulate fillers that also exhibit flame retardant properties (or which may be used separately as flame retardants) can include but are not limited to, organobromines, organochlorines, decabromodiphenyl ether, decabromodiphenyl ethane, or combinations thereof. Exemplary polymeric brominated compounds that can be used as a particulate filler and/or a flame retardant can include brominated polystyrenes, brominated carbonate oligomers, brominated epoxy oligomers, tetrabromophthalic anhydride, tetrabromobisphenol A, hexabromocyclododecane, chlorendic acid, ethers of chlorendic acid, chlorinated paraffins, or combinations thereof. In one example, a particulate filler that can have flame retardant properties (or which may be used separately as a flame retardant component) can be a metal and phosphorus containing composition such as aluminum diethylphosphinate, calcium diethylphosphinate, or combinations thereof. Exemplary mineral compounds that can be used as a particulate filler having flame retardant properties or a flame retardant can include aluminum hydroxide, magnesium hydroxide, huntite, hydromangestie, phosphorus, red phosphorus, boehmite, boron, or combinations thereof. In yet another example, a particulate filler with flame retardant properties (or which may be used separately as a flame retardant component) can include a phosphorus and halogen containing composition such as tris(2,3-dibromopropyl) phosphate, chlorinated organophosphates, tris(1,3-dichloro-2-propyl) phosphate, tetrekis(2-chloroethyl) dicloro-isopentyldiphosphate, tris(1,3-dichloroisopropyl) phosphate, tris (2-chloroisopropyl) phosphate, or combinations thereof.

In yet other examples, a particulate filler with flame retardant properties (or which may be used separately as a flame retardant component) can be a phosphorus containing composition such as phosphates; phosphonates; phoshpinates; phosphonate ester; 5-ethyl-2-methyl-1,3,2,-dioxaphosphoranian-5-yl)methyl dimethyl phosphonate P oxide; bis[(-ethyl-2-methyl-1,3,2-dioxaphosphorinan-5-yl)methyl] methyl phosphonate P,P'-dioxide; or combinations thereof. The phosphorus containing composition can have various oxidation states, can be a closed ring structure, and/or can be a water soluble phosphorus containing compound. In one example, the phosphorous containing composition can be a phosphonate ester with one or two closed 4 to 6 member phosphorus containing ring structures. Exemplary commercially available closed ring phosphorus containing compositions are FR-102® (Shanghai Xusen Non-Halogen Smoke Suppressing Fire Retardants Co. Ltd, China) and Aflammit® (Thor, Germany). In some examples, the particulate filler with flame retardant properties can be an organophosphate such as aliphatic phosphate, aliphatic phosphonate, aromatic phosphonate, aliphatic organophosphate, aromatic organophosphate, polymeric organophosphate with 2 or 3 oxygen atoms attached to a central phosphorus, or a combination thereof.

In yet other examples, a particulate filler with flame retardant properties (or which may be used separately as a flame retardant component) can include a nitrogen containing composition such as, melamine, melamine derivatives, melamine cyanurate, melamine polyphosphate, melem (heptazine derivative), melon (heptazine derivative), or combinations thereof. In some examples, the particulate filler with flame retardant properties can be a phosphorus and nitrogen containing composition such as ammonium polyphosphate (APP), poly 4,4-diaminodiphenyl methane spirocyclic pentaerythritol bisphosphonate (PDSPB), 1,4-di(diethoxy thiophosphamide bezene (DTPAB), or combinations thereof.

Examples of commercially available products with flame retardant properties can include FR102 (Shanghai Xusen Co Ltd, China), Aflammit® PE, Aflammit® MSG, solid Aflammit® powder (all available from Thor, Germany), Exolit® AP compounds (Clariant, North America), Disflamoll® DPK (Lanxess, Germany), Phoslite B compounds (Italmatch Chemicals, Italy), or SpaceRite® S-3 (J.M. Huber Corp, Delaware).

The particulate filler(s) can be present in the image-receiving layer from about 2 wt % to about 95 wt %. In yet other examples, the particulate filler(s) can be present in the image-receiving layer from about 10 wt % to about 90 wt %, from about 5 wt % to about 90 wt %, from about 5 wt % to about 80 wt %, from about 10 wt % to about 60 wt %, from about 15 wt % to about 50 wt %, or from about 15 wt % to about 70 wt %.

Thus, there are examples where a particulate filler can also have flame retardant properties. However, there are other examples where the particulate filler is not particularly flame retardant and is admixed with a secondary filler that is a flame retardant component. When a particulate filler and a flame retardant are both present, the ratio of particulate filler to flame retardant component can vary. For example, such a "filler package" can include a ratio of particulate filler to flame retardant component from about 1:1 to about 35:1 by dry weight, from about 2:1 to about 35:1 by dry weight, from about, 3:1 to about 20:1 by dry weight, from about 5:1 to about 15:1 by dry weight, or from about 10:1 to about 20:1 by dry weight.

The particle size of the particulate filler and/or the flame retardant component can also vary. In one example, the particulate filler and/or the flame retardant component can independently have an average particle size ranging from about 0.1 µm to about 20 µm, from about 0.2 µm to about 18 µm, from about 0.5 µm to about 10 µm, or from about 1 µm to about 5 µm. The particulate filler and/or the flame retardant component can be added to the coating composition used to prepare the image-receiving layer in the form of a dry powder, dispersed in a slurry, or in the form of an aqueous suspension.

Figure 2:
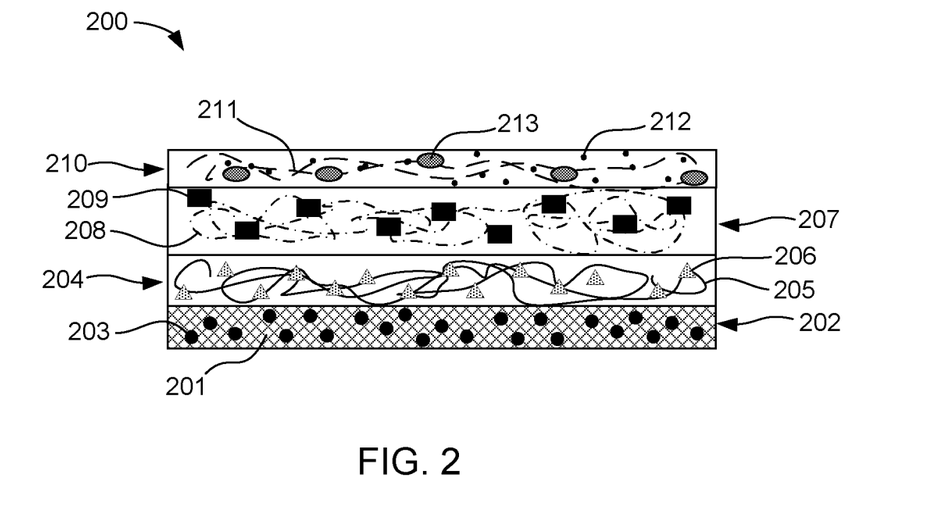
FIG. 2 schematically displays a cross-sectional view of an example fabric print medium including a protectant layer in accordance with the present disclosure.

As shown in FIG. 2, in some examples, the fabric print medium can further include a protectant layer 210. Thus, the fabric print medium 200 can include a treated fabric base substrate 202 which includes a fabric base substrate 201 treated with a water-repellant agent 203. To the treated fabric, an adhesion promoting layer 204, an image-receiving layer 207, and a protectant layer 210 can be applied. The adhesion promoting layer can include a first polymeric binder 205 and a physical networking component 206. The image-receiving layer 207 can include a second polymeric binder 208 and a particulate filler 209. The protectant layer 210 can enhance the durability of a printed image. In one example, the protectant layer can include a first crosslinked polymeric network 211 and a second crosslinked polymeric network 212. In some examples, the protectant layer 210 can be composed of the first and second polymeric network without any fillers, and in other examples, the protectant layer 210 can also include the particulate filler (which may or may not also be flame retardant, e.g., flame retardant powder). In some examples, the protectant layer can further include a wax 213.

The first crosslinked polymeric network and the second crosslinked polymeric network in the protectant layer can be different and independently can include polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, or a combination thereof.

In one example, the first crosslinked polymeric network, the second crosslinked polymeric network, or the combination thereof, can include a polyacrylate or multiple polyacrylates. Exemplary polyarcrylates can include polymers made by hydrophobic addition monomers which include, but are not limited to, C1 to C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), or combinations thereof.

In some examples, polymers created from the polymerization and/or copolymerization of alkyl acrylate, alkyl methacrylate, vinyl esters, and/or styrene derivatives can also be useful. In one example, the polyacrylate based polymer can include polymers that have a glass transition temperature greater than 10° C. In yet other examples, the polyacrylate based polymer can include polymers that have a glass transition temperature of greater or equal to 20° C., greater or equal to 30° C., or greater or equal to 40° C. In some examples, the glass transition temperature can be equal to or less than 50° C.

In another example, the first or second crosslinked polymeric network can include a polyurethane polymer. In one example, the polyurethane polymer can be hydrophilic. In another example, the polyurethane can be formed by reacting an isocyanate with a polyol. In one example, a polyurethane prepolymer can be prepared with a NCO/OH ratio from about 1.2 to about 2.2. In other examples, the polyurethane prepolymer can be prepared with a NCO/OH ratio from about 1.4 to about 2.0 or from about 1.6 to about 1.8. Exemplary isocyanates that can be used to create the polyurethane polymer can include toluenediisocyanate, 1,6-hexamethylenediisocyanate, diphenylmethanediisocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyltriphenylmethanetetraisocyanate, triphenylmethanetriisocyanate, tris(isocyanatephenyl)thiophosphate, or combinations thereof. Commercially available isocyanates can include Rhodocoae® WT 2102 (Rhodia AG, France), Basonat™ LR 8878 (BASF Corp., North America), Desmodur® DA, and Bayhydur® 3100 (both Bayer AG, Germany). In some examples, the isocyanate can be protected from water. Exemplary polyols that can be used to create the polyurethane polymer can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclohexanedimethanol; 1,2,3-propanetriol; 2-ethyl-2-hydroxymethyl-1,3-propanediol; or combinations thereof. In some examples, the isocyanate and the polyol can have less than three functional end groups per molecule or can have less than five functional end groups per molecule. In yet another example, the polyurethane can be formed from a polyisocyanate having at least two isocyanate functionalities and a polyol having at least two hydroxyl or amine groups. Exemplary polyisocyanates can include diisocyanate monomers and oligomers. The weight average molecular weight of the polyurethane prepolymer can range from about 20,000 Mw to about 200,000 Mw as measured by gel permeation chromatography. In another example, the weight average molecular weight of the polyurethane prepolymer can range from about 40,000 Mw to about 180,000 Mw, or from about 60,000 Mw to about 140,000 Mw as measured by gel permeation chromatography. Exemplary commercially available polyurethane polymers can include polyester based polyurethanes, U910, U938, U2101, and U420; polyether based polyurethane, U205, U410, U500, and U400N; polycarbonate based polyurethanes, U930, U933, U915, and U911; castor oil based polyurethane, CUR21, CUR69, CUR99 and CUR991; or combinations thereof (all available from Alberdingk Boley® Inc., North Carolina).

In some examples, the polyurethane can be aliphatic or aromatic. In one example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In another example, the polyurethane can include an aromatic polyether polyurethane, an aliphatic polyether polyurethane, an aromatic polyester polyurethane, an aliphatic polyester polyurethane, or a combination thereof. Exemplary commercially available examples of these polyurethanes can include NeoPac™ R-9000, R-9699, and R-9030 (Zeneca Resins, Massachusetts), Printrite® DP376 (Lubrizol Advanced Materials, Inc., Delaware), Sancure® AU4010 (Lubrizol Advanced Materials, Inc., Delaware), Hybridur® 570 (Air Products and Chemicals Inc., Pennsylvania), Sancure® 2710, Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 2026, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517, Sancure® 1591, Sancure® 2255, Sancure® 2260, Sancure® 2310, Sancure® 2725, Sancure® 12471 (all commercially available from Lubrizol Advanced Materials, Inc., Delaware), or combinations thereof.

In some examples, the polyurethane can be cross-linked using a cross-linking agent. For example, the cross-linking agent can be a blocked polyisocyanate. In one example, the blocked polyisocyanate can be blocked using polyalkylene oxide units which can be removed by heating the blocked polyisocyanate to a temperature at or above the deblocking temperature of the blocked polyisocyanate in order to yield free isocyanate groups. An exemplary commercially available blocked polyisocyanate can include Bayhydur® VP LS 2306 (Bayer AG, Germany). In another example, the cross-linking can occur at trimethyloxysilane groups along the polyurethane chain. Hydrolysis can cause the trimethyloxysilane groups to crosslink and form a silesquioxane structure. In another example, the crosslinking can occur at acrylic functional groups along the polyurethane chain. Nucleophilic addition to an acrylate group by an acetoacetoxy functional group can allow for crosslinking on polyurethanes including acrylic functional groups. In other examples, the polyurethane polymer can be a self-crosslinked polyurethane. In one example, a self-crosslinked polyurethane can be formed by reacting an isocyanate with a polyol.

In another example, the first crosslinked polymeric network, the second crosslinked polymeric network, or a combination thereof, can include an epoxy or a combination of different epoxies. The epoxy can be an alkyl epoxy resin, an alkyl aromatic epoxy resin, an aromatic epoxy resin, epoxy novolac resins, epoxy resin derivatives, or combinations thereof. In some examples, the epoxy can include an epoxy functional resin having one, two, three, or more pendant epoxy moieties. Commercially available exemplary epoxy functional resins can include Ancarez™ AR555, Ancarez™ AR550 (both available from Air Products and Chemicals Inc., Pennsylvania), Epi-rez® 3510W60, Epi-rez® 3515W6, Epi-rez® 3522W60 (all available from Hexion, Ohio), or combinations thereof. In some examples, the epoxy resin can be an aqueous dispersion of an epoxy resin. Exemplary commercially available aqueous dispersions of epoxy resins can include Araldite® PZ3901, Araldite® PZ3921, Araldite® PZ3961-1, Araldite® PZ323 (commercially available from Huntsman Advanced Materials, North America), Waterpoxy® 1422 (commercially available from BASF Corp., North America), Ancarez™ AR555 1422 (Air Products and Chemicals, Inc., Pennsylvania), or combinations thereof. In yet another example, the epoxy resin can include a polyglycidyl or polyoxirane resin.

In one example, the epoxy resin can be a self-crosslinked epoxy resin such as polyglycidyl resins, polyoxirane resins, or combinations thereof. These resins can be self-crosslinked by a catalytic homopolymerization reaction of the oxirane functional group or by reacting with co-reactants such as, polyfunctional amines, acids, acid anhydrides, phenols, alcohols, and/or thiols. In another example, the epoxy resin can be crosslinked by an epoxy resin hardener. The epoxy resin hardener can be included in solid form, in a water emulsion, and/or in a solvent emulsion. Exemplary epoxy resin hardeners can include liquid aliphatic amine hardeners, cycloaliphatic amine hardeners, amine adducts, amine adducts with alcohols, amine adducts with phenols, amine adducts with alcohols and phenols, amine adducts with emulsifiers, ammine adducts with alcohols and emulsifiers, polyamines, polyfunctional polyamines, acids, acid anhydrides, phenols, alcohols, thiols, or combinations thereof. Exemplary commercially available epoxy resin hardeners can include Anquawhite® 100 (Air Products and Chemicals Inc., Pennsylvania), Aradur® 3985 (Huntsman Advanced Materials, North America), Epikure® 8290-Y-60 (Hexion, Ohio), or combinations thereof. In another example, the first crosslinked polymeric network, the second crosslinked polymeric network, or a combination thereof, can include an epoxy resin with additional components. For example, the first and/or second crosslinked polymeric network can include a water based epoxy resin and a water based polyamine. In another example, the first and/or second crosslinked polymeric network can include a vinyl urethane hybrid polymer, a water based epoxy resin, and a water based polyamine epoxy resin hardener. In yet another example, the first and/or second crosslinked polymeric network can include an acrylic-urethane hybrid polymer, a water based epoxy resin, and a water based polyamine epoxy resin hardener.

In a further example, the first or second crosslinked polymeric network can include a styrene maleic anhydride (SMA). A commercially available example of SMA can include NovaCote® 2000 (Coim, Italy). In yet another example, the styrene maleic anhydride can be combined with an amine terminated polyethylene oxide (PEO), amine terminated polypropylene oxide (PPO), a copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. Utilizing an amine terminated PEO and/or PPO in combination with a SMA can allow for the user to retain the glossy features of the SMA while eliminating the brittle nature of the SMA. Exemplary commercially available amine terminated PEO and/or PPO compounds can include Jeffamine® XTJ-500, Jeffamine® XTJ-502, and Jeffamine® XTJ D-2000 (all available from Huntsman Advanced Materials, North America). In some examples, a weight ratio of the SMA to the amine terminated PEO and/or PPO can range from about 100:1 to about 2.5:1. In another example, a weight ratio of the SMA to the amine terminated PEO and/or PPO can range from about 90:1 to about 10:1 or from about 75:1 to about 25:1.

In some examples, the first crosslinked polymeric network can be crosslinked to itself, to the second crosslinked polymeric network, or to itself and to the second crosslinked polymeric network. In one example, the second crosslinked polymeric network can be crosslinked to itself, to the first polymeric network, or to itself and the first polymeric network. When the first crosslinked polymeric network and the second crosslinked polymeric network are not crosslinked to one another they can be entangled or can appear layered onto one another.

The first and second crosslinked polymeric networks can be present in the protectant layer at a variety of concentrations. In one example, the first and second crosslinked polymeric networks can collectively range from about 5 wt % to about 95 wt % of the protectant layer. In other examples, the first and second crosslinked polymeric networks can collectively range from about 10 wt % to about 85 wt %, from about 20 wt % to about 75 wt %, or from about 30 wt % to about 70 wt %. In some examples, the first and second crosslinked polymeric networks can be present at approximately equal weight ratios. In other examples, the first and second crosslinked polymeric networks can be present at different weight ratios. In some examples, a weight ratio of the first crosslinked polymeric network to the second crosslinked polymeric network can range from about 1:9 or about 9:1. Other examples can be from 1:9 to 1:1, 1:5 to 5:1, 1:3 to 3:1, or 1:2 to 2:1. More specifically, a weight ratio of the first crosslinked polymeric network to the second crosslinked polymeric network can be about 1:1, 1:2, 1:3; 1:4, 1:5, 1:6, 1:7, 1:8, 1:9, 2:1, 3:1, 4:1, 5:1, 6:1, 7:1, 8:1, or 9:1.

In some examples, the protectant layer can further include a particulate filler, again which may or may not be a flame retardant. A separate flame retardant powder and/or flame retard liquid can also be present. The particulate filler can be the same as described above in the description of the image-receiving layer. In other examples, the particulate filler and/or secondary flame retardant can be of a different type of chemical composition than the one selected for use in the image-receiving layer. In one example, the weight ratio of the particulate filler (and secondary flame retardant, if present) to the organic first crosslinked polymeric network and a second crosslinked polymeric network can range from 0.01 to 5, for example. In other examples, the weight ratio can range from 0.04 to 2.5, from 0.1 to 3, from 0.05 to 2, or from 1 to 4.

In some examples, the protectant layer can further include a wax. In one example, the wax can include synthetic wax, petroleum wax, vegetable wax, animal wax, mineral wax, paraffin wax, microcrystalline wax, polyethylene wax, or a combination thereof. In one example, the wax can include a petroleum wax. In yet another example, the wax can include a high melt polyethylene wax. In some examples, a high melt wax can soften at temperatures of at least 130° C. or at least 150° C. In a further example, the wax can include a synthetic wax. Exemplary commercially available waxes can include Slip-Ayd® SL100, Slip-Ayd® SL177, Slip-Ayd® SL18, Slip-Ayd® SL404, Slip-Ayd® SL417, Slip-Ayd® SL425, Slip-Ayd® SL4709, Slip-Ayd® SL506, Slip-Ayd® SL508, Slip-Ayd® SL50, Slip-Ayd® SL523, Slip-Ayd® SL530, Slip-Ayd® SL551, Slip-Ayd® SL555, Slip-Ayd® SL600, Slip-Ayd® SL620, Slip-Ayd® SL700, Slip-Ayd® SL78, Slip-Ayd® SL94 (all available from Elementis Specialties Inc., New Jersey), Acculin® 400, Acculin® 500, Acculin® 600, Acculin® 655, Acculin® 725, Acculin® 850, Acculin® 1000, Acculin® 2000 (all available from The International Group Inc., Delaware), or combinations thereof. In some examples, the wax present in the protectant layer includes from 1 wt % to 20 wt % of the wax, from about 3 wt % to about 20 wt %, from about 5 wt % to about 15 wt %, or from about 7 wt % to about 15 wt %.

Figure 3:
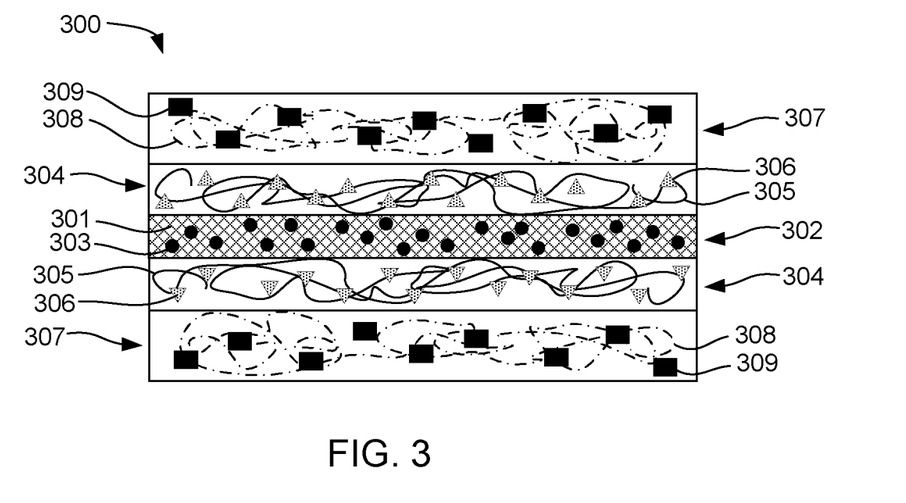
FIG. 3 schematically displays a cross-sectional view of a two-sided fabric print medium in accordance with the present disclosure.
Figure 4:
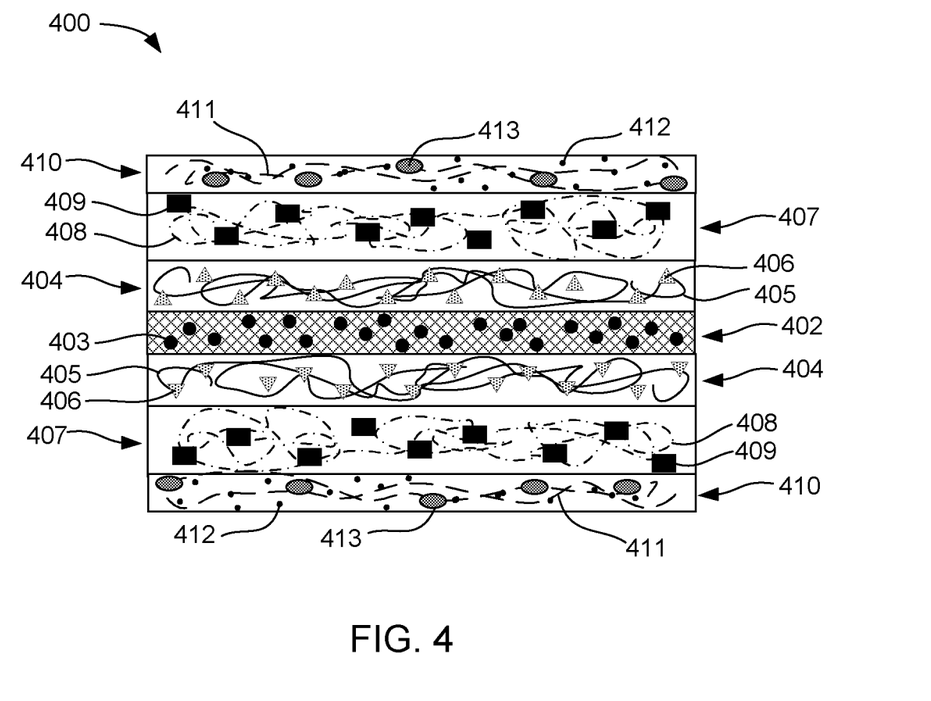
FIG. 4 schematically displays a cross-sectional view of a two-sided fabric print medium including a protectant layer in accordance with the present disclosure.

The coatings can be applied to one or both sides of the fabric base substrate. Fabric print media with coatings applied to one side of the treated fabric base substrate are shown in FIGS. 1 and 2. FIG. 3 schematically displays a fabric print medium 300 having a treated fabric base substrate 302, where the fabric base substrate 301 is treated with a water-repellant agent 303. The fabric print medium also includes an adhesion promoting layer 304 and an image-receiving layer 307. The adhesion promoting layer can include a first polymeric binder 305 and a physical networking component 306. The image-receiving layer 307 can include a second polymeric binder 308 and a particulate filler 309. This media is an exemplary two-sided print media. FIG. 4 also displays a two-sided print medium, where the fabric print medium 400 has two print sides and a protectant layer 410 on both sides of the medium. Specifically FIG. 4 shows a treated fabric base substrate 402 with a fabric base substrate 401 treated with a water-repellant agent 403, an adhesion promoting layer 404, an image-receiving layer 407, and the protectant layer 410. The adhesion promoting layer can include a first polymeric binder 405 and a physical networking component 406. The image-receiving layer 407 can include a second polymeric binder 408 and a particulate filler 409. In one example, the protectant layer can include a first crosslinked polymeric network 411 and a second crosslinked polymeric network 412. In some examples, the protectant layer can further include a wax 413. While FIG. 4 displays the protectant layer on both sides, it is noted that this layer is an optional layer and can be present on one or both sides of the media and can include wax on neither side, on one side, or on both sides of the media.

Figure 5:
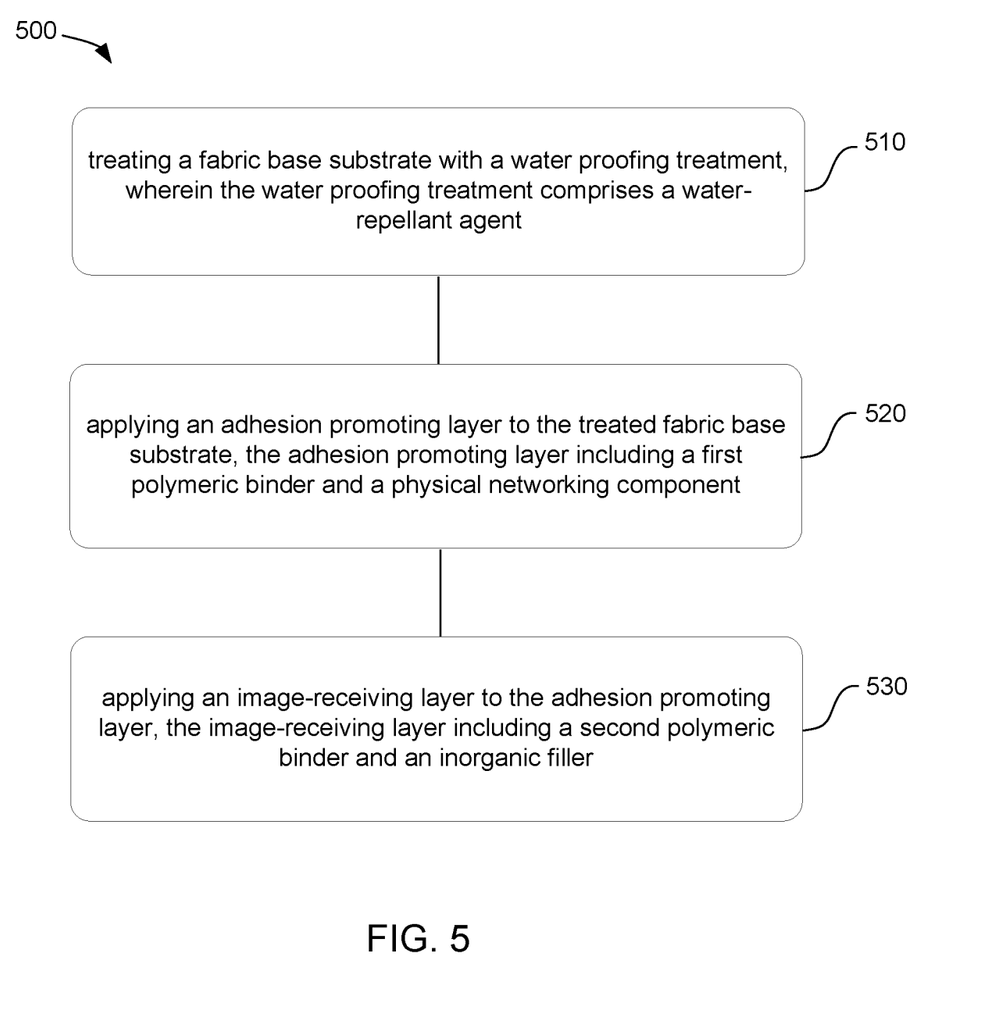
FIG. 5 graphically represents an example method of manufacturing a fabric print medium in accordance with the present disclosure.

In another example, a method of manufacturing a fabric print medium 500 is provided in FIG. 5. The method can include treating 510 a fabric base substrate with a water proofing treatment, applying 520 an adhesion promoting layer, and applying 530 an image-receiving layer. In one example, the water proofing treatment can include a water-repellant agent. The adhesion promoting layer can be applied to the treated fabric base substrate and can include a first polymeric binder and a physical networking component. The image-receiving layer can be applied to the adhesion promoting layer and can include a second polymeric binder and a particulate filler. In one example, the method can further include applying a protectant layer over the image-receiving layer. In one example, the protectant layer can include a first crosslinked network and a second crosslinked network. In some examples, the protectant layer can further include a wax. The fabric base substrate, water proofing treatment, adhesion promoting layer, image-receiving layer, and the protectant layer can be as described above. When the fabric print medium has two printing sides, the fabric substrate can simply be turned over and the method of manufacturing can be repeated on the other side of the treated fabric base substrate. In one example, the step of treating the fabric base substrate can include dipping the fabric base substrate in the water proofing treatment to form the treated fabric base substrate and rolling the treated fabric base substrate between a pair of rollers. In one example, the rollers can have a pressure of 30 psi to 100 psi, from about 50 psi to about 75 psi, or from about 40 psi to about 80 psi. In some examples, the treating can further include allowing the treated fabric base substrate to dry prior to applying the adhesion promoting layer, the image-receiving layer, and when present, the optional protectant layer. The adhesion promoting layer, the image-receiving layer, and the protectant layer (if present) can be applied to one or both sides of the treated fabric base substrate. These layers can be generally applied to the side or sides of the treated fabric base substrate for printing. When the fabric print medium is intended to have one printable side, then the adhesion promoting layer, the image-receiving layer, and the protectant layer (if present) can be applied to one or both sides of the treated fabric base substrate. When the fabric print medium is intended to have two print sides, then the adhesion promoting layer, the image-receiving layer, and the protectant layer (if present) can be applied to both sides of the treated fabric base substrate.

The steps of applying one or more than one of the various layers can include using a floating knife process, a knife on roll mechanism process, or a transfer coating process. In one example, the floating knife process can include stretching the treated fabric base substrate to form an even uniform surface. The floating knife process can further include transporting the fabric under a stationary knife blade. In another example, the step of applying the adhesion to one or more of the layers can include applying a foam coating. The foam coating can be applied using a knife-on-the roll mechanism. In one example, the knife-on-the roll mechanism can be followed by passing the fabric through calendering pressure nips. The calendering can be done either at room temperature or at an elevated temperature. In one example, the elevated temperature can range from about 25° C. to about 125° C., from about 40° C. to 100° C., or from about 50° C. to about 75° C. In another example, the pressure can range from about 75 psi to about 6,000 psi, from about 100 psi to about 5,000 psi, from about 500 psi to about 2,500 psi, or from about 750 psi to about 1,500 psi. In yet another example, the coating process can include transferring the coating composition onto the treated fabric base substrate. When the coating composition is transferred, the coating can be spread onto a release substrate to form a film. The film can then be laminated onto the fabric.

In some examples, the method can further include injecting air into a formulation of the image-receiving layer before applying the layer. Injecting air can generate air voids and retain these voids after drying. In one example, air can be injected into the formulation at a density ranging from about 0.2 g/cm$^3$ to about 0.9 g/cm$^3$. In other examples, the air can be injected at a density ranging from about 0.3 g/cm$^3$ to about 0.8 g/m$^3$, from about 0.35 g/cm$^3$ to about 0.7 g/cm$^3$, or from about 0.4 g/cm$^3$ to about 0.55 g/m$^3$. In some examples, the method can further include applying pressure using pressure nips or off-line calender to the fabric media after applying the image-receiving layer.

Regarding coating weights, the adhesion promoting layer can be applied at a dry coat weight ranging from about 0.5 gsm to about 10 gsm. The image-receiving layer can be applied over the adhesion promoting layer at a dry coat weight from about 1 gsm to 250 gsm. In other examples, the image-receiving layer can be applied at a dry coat weight from about 5 gsm to about 200 gsm, from about 10 gsm to about 150 gsm, from about 20 gsm to about 150 gsm, from about 30 gsm to about 50 gsm, from about 50 gsm to about 100 gsm, or from about 75 gsm to about 250 gsm. The image-receiving layer can be applied at a thickness from about 0.5 μm to about 200 μm. In other examples, the image-receiving layer can be applied at a thickness from about 1 μm to about 50 μm, from about 2 μm to about 200 μm, from about from 5 μm to about 150 μm, from about 25 μm to about 175 μm, from about 50 μm to about 175 μm, or from about 75 μm to about 200 μm. In one example, the image-receiving layer can be applied to the treated fabric base substrate at a thickness from about 2 μm to 200 μm with a dry coat weight ranging from about 5 gsm to about 200 gsm. If applied, the protectant layer can be applied over the image-receiving layer at a dry coat weight ranging from about 0.1 gsm to about 100 gsm. In other examples, the protectant layer can be applied at a dry coat weight ranging from about 0.5 gsm to about 75 gsm, from about 0.5 gsm to 50 gsm, from about 3 gsm to about 15 gsm, from about 5 gsm to about 75 gsm, or from about 50 gsm to about 100 gsm. In some examples, the protectant layer can be applied at a thickness ranging from about 0.5 μm to about 75 μm, from about 1 μm to about 50 μm, from about 5 μm to about 30 μm, or from about 25 μm to about 75 μm. In one example, the protectant layer can be applied at a thickness from 1 μm to 50 μm with a dry coat weight ranging from 0.5 gsm to 50 gsm. In some examples, the image-receiving layer can be at least two times thicker than the protectant layer. In another example, the image-receiving layer can be at least three times thicker than the protectant layer.

Figure 6:
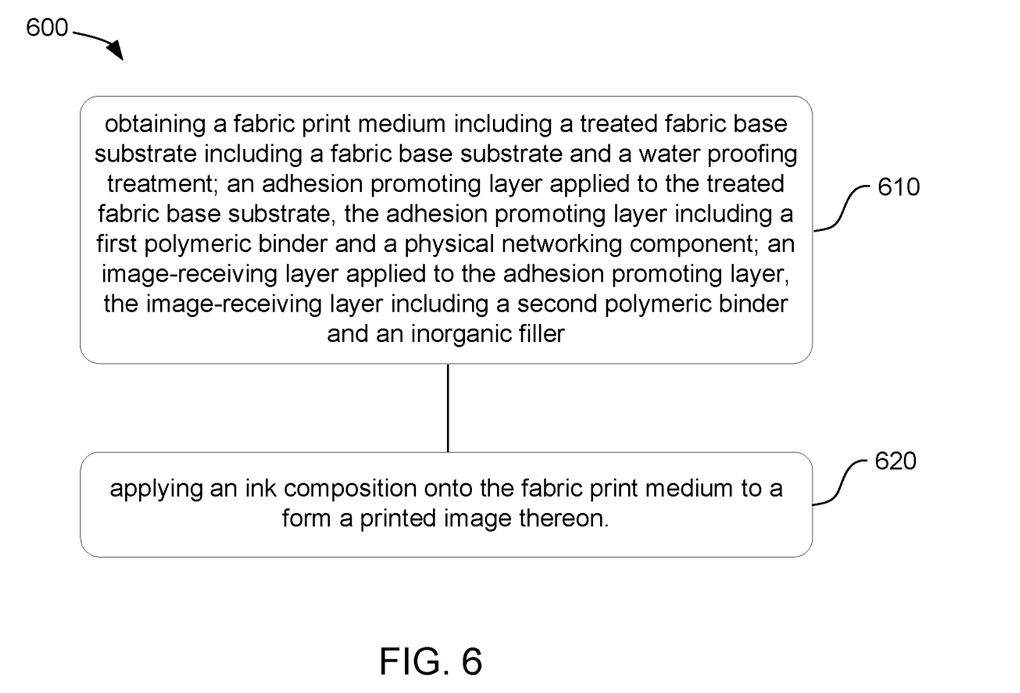
FIG. 6 graphically represents an example printing method in accordance with the present disclosure.

In another example, a printing method 600 as shown in FIG. 6, can include obtaining 610 a fabric print medium and applying 620 an ink composition onto the fabric print medium to form a printed image thereon. The fabric print medium can include a treated fabric base substrate, an adhesion promoting layer, and an image-receiving layer. The treated fabric base substrate can include a fabric base substrate and a water proofing treatment. The adhesion promoting layer can be applied to the treated fabric base substrate and can include a first polymeric binder and a physical networking component. The image-receiving layer can be applied to the adhesion promoting layer and can include a second polymeric binder and a particulate filler. In one example, obtaining the fabric print medium further includes providing a fabric print medium that also includes a protectant layer applied to the image receiving layer. The protectant layer can include a first crosslinked polymeric network and a second crosslinked polymeric network. In some examples, the protectant layer can further include a wax. When the printing method incorporates a two sided printed image then the adhesion promoting layer, the image-receiving layer, and the optional protectant layer can be applied to both sides of the treated fabric base substrate and the fabric print medium is flipped over and a second application of an ink composition is applied on the fabric print medium to form a printed image on the opposite side. The fabric base substrate, water proofing treatment, adhesion promoting layer, image receiving layer, and the protectant layer can be as described above.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the disclosure has been provided with particularity, the following describes further detail in connection with what are presently deemed to be the acceptable examples.

Example 1—Fabric Print Media Preparation

Seven fabric print media were prepared using a 100% woven polyester fabric having a weight of 112 gsm and thickness of 175 μm. The fabric print media were coated with a water-proofing treatment, as shown in Table 1 below. The treatment process involved dipping the media in the water-proofing treatment for about 30 to 120 seconds, removing the media from the water-proofing treatment, and rolling the treated fabric base substrate between a pair of rollers having a pressure of 50 psi. The treated fabric base substrate was allowed to dry at 150° C. for 5 min. The water repellant agent was present in the water proofing treatment composition at from 10 g/L to 40 g/L, as set forth in Table 1.

When the treated fabric base substrate was dry, an adhesion promoting layer was applied to one side of the fabric at a weight of 3 to 7 gsm. The composition of the adhesion promoting layer is also shown in Table 1. The adhesion promoting layer was applied using a 2.4 m width flat tip blade production knife on a knife coater. During processing, the adhesion promoting layer was applied directly to the treated fabric base substrate across the entire width of the web in front of a fixed knife. As the web was transporting under the knife, the forward motion of the fabric and fixed knife barrier applied the coating material in a rotatory motion. This rolling bank of coating component served as a coating reservoir. After the knife, the coating web was dried through a drying oven using hot air. The thickness of the coatings, or coat-weight, was controlled by the coating slides, web tension and type of knife. The coating speed was in the range of 30 to 40 m/min.

TABLE 1

Water Proofing Treatment and Adhesion Promoting Layer

| Fabric Print Medium ID | Water Repellant Agent of Water Proofing Treatment | | Adhesion Promoting Layer | |
|---|---|---|---|---|
| | Phobol ® CP-C | Baygard WRS ® | Genflo 3000 (Polymeric Binder) | Sterocoll ® FS (Physical Networking Component) |
| A | 20 g/L | — | 5-7 gsm | 0.01 wt % of polymer |
| B | — | 30 g/L | 5-7 gsm | 0.01 wt % of polymer |
| C | — | 10 g/L | 5-7 gsm | 0.01 wt % of polymer |
| D | — | 40 g/L | 5-7 gsm | 0.01 wt % of polymer |
| E | — | — | 5-7 gsm | 0.01 wt % of polymer |
| F | — | 30 g/L | 5-7 gsm | — |
| D | — | 30 g/L | — | — |

Phobol ® CP-C is a short-chained fluorochemical water repellant compound (Huntsman Advanced Materials, North America), Baygard ® WRS is a hydrocarbon based fluorine free, heavy metal free, and formaldehyde free water-repellent agent (Tanatex Chemicals, Netherlands), GenFlo ® 3000 is a carboxylated styrene-butadiene copolymer binder (Omnova Solutions, Ohio), and Sterocoll ® FS is an aqueous anionic dispersion of an ethyl acrylate-carboxylic acid copolymer (BASF Corp. North America).

Following application of the adhesion promoting layer, an image-receiving layer and a protectant layer were applied. The formulation for both of these layers is shown in Tables 2 and 3, below.

TABLE 2

Image-Receiving Layer

| Ingredient | Type | Amount (dry weight) | Weight Percentage |
|---|---|---|---|
| Edolan ® AB | Acrylic Polymeric Binder | 40 | 28.3 |
| Spacerite ® S3 | Particulate Filler and Flame Retardant (Aluminum tri-hydroxide) | 100 | 70.7 |
| Tegowet ® 510 | Surfactant | 1 | 0.7 |
| Foamaster ® MO 2185 | De-foamer | 0.5 | 0.3 |

Edolan ® AB (Tanatex Chemicals, Netherlands), Spacerite ® S3 (J. M. Huber Corp, Delaware), Tegowet ® 510 (Palmer Holland, Ohio), and Foamaster ® MO 2185 (BASF Corp., North America)

TABLE 3

Protectant Layer

| Ingredient | Type | Amount (dry weight by parts) | Weight Percentage |
|---|---|---|---|
| BYK ®-Dynwet 800 | Silicone free wetting agent | 1 | 4.59 |
| BYK ® 024 | VOC-free defoamer | 0.5 | 2.29 |

TABLE 3-continued

Protectant Layer

| Ingredient | Type | Amount (dry weight by parts) | Weight Percentage |
|---|---|---|---|
| Araldite ® PZ 3901 | Cross-linked polymeric epoxy resin | 10 | 45.87 |
| Aradur ® 3985 | Amine Cross-linking agent | 1 | 4.59 |
| Sancure ® 2016 | Polyurethane polymer | 5.8 | 26.60 |
| Sancure ® AU 4010 | Self-crosslinking aliphatic polyurethane-acrylic network | 3.5 | 16.06 |

BYK ®-Dynwet 800 and BYK ® 024 (Byk Additives and Instruments, Germany), Araldite ® PZ 3901 (Huntsman Advanced Materials, Salt Lake City, UT), Aradur ® 3985 (Huntsman Advanced Materials, Salt Lake City, UT), and Sancure ® 2016 and Sancure ® AU 4010 (Lubrizol, Wickliffe, OH).

The image-receiving layer was applied at 20 gsm using a 3 mm U-type knife at a speed of 20 m/min, and knife depth of 1 cm. The protectant layer was applied at 5-7 gsm using a flat type knife at a speed of 20 m/min and a knife depth of 15 mm. After all the layers were applied, the fabric printed medium was dried using a 40 m long hot air oven with eight controlled oven units. An in-line pressure nip was also closed to the primary and image-receiving coatings to further smooth out the surface.

Example 2—Performance Testing

The seven fabric print medium samples (A-G) were printed using an HP® Latex L360 Printer equipped with HP® 789 ink (HP®, Inc. California). The printer was set with a heating zone temperature at about 50° C., a cure zone temperature at about 116° C., and an air pressure at about 17500 mm H2O. The printed fabric medium samples were evaluated for performance in the areas of overall print quality and image durability (coin scratch, dark line, and winkle tests).

Image Quality—

Image quality tests were conducted by measuring the color gamut, using 72 color patches. The color gamut was measured on a Barbieri® Spectro LFP 5.3 device (Micro Precision Test Equipment, Germany. The image quality of the prints related to bleed sharpness, blur, noise/graininess, banding, mottle, patchiness, line quality, and text quality, were evaluated visually from the printed samples using a scale of 1-5 (with 1 being the worst and 5 being the best).

Coin Scratch Test—

Anti-scratch ability was evaluated by a coin scratching test method using Taber® 5700 Linear Abraser (available from Taber® Industries, New York). The coin was set at a 75° angle and the loading force was incrementally increased from 130 g, to 300 g, to 550 g, and to 800 g.

Dark Line and Wrinkle—

10"×10" samples were printed with a 3.33"×10" area of 400% (composite—CMYK) black, a 3.33"×10" area of 100% magenta and a 3.33"×10" unprinted area (white). Within 1 hour of printing, samples were wrinkled into a small ball into the center of a hand under heavy pressure for 5 seconds. Within 1 hour of testing (wrinkling), the balled-up sample was released and placed in a tension frame for viewing with a backlight. The samples were ranked from 1 to 5 for both Dark Line defects (areas where the fabric optical density has increased to form a visible dark line formed during wrinkling) and Wrinkle ink damage (areas of the fabric where ink has been removed, leaving visible white areas). For both types of defects, the following visual score was used:

5—no defect was observable in the sample from any viewing distance.

4—no defect was observable in the sample from a 1 meter viewing distance, however defects were visible from less than 1 meter.

3—some minor defects were visible in the sample at a 1 meter viewing distance, however the defects visible at 1 meter were not obvious to a casual observer who was not proactively looking for defects.

2—defects were readily visible to a casual observer who was not proactively looking for defects at a 1 meter viewing distance but not readily visible at a 10 meter distance.

1—defects were readily visible to a casual observer who is not proactively looking for defects at a 10 meter viewing distance.

TABLE 4

Performance Results

| Fabric Print Medium | Image Quality | Coin Scratch | Dark Line | Winkle |
|---|---|---|---|---|
| A | 5 | 5 | 5 | 5 |
| B | 5 | 5 | 5 | 5 |
| C | 5 | 5 | 3 | 2 |
| D | 5 | 2 | 5 | 3.5 |
| E | 5 | 5 | 2 | 4 |
| F | 5 | 5 | 1 | 3 |
| G | 5 | 2 | 5 | 2 |

As indicated in Table 4 above, the fabric print medium that included the waterproofing treatment, adhesion promoting layer, image-receiving layer, and the protectant layer (Mediums A and B) had good overall print quality, durability, and performance. When the waterproofing treatment was applied at 10 g/L (Medium C) or at 40 g/L (Medium D) the durability and wrinkle performance decreased to some degree. This indicates that the amount of water proofing treatment that is applied to the fabric base substrate is a factor in determining the overall performance of the printed image. Medium E did not include a waterproofing treatment and had poor dark line performance. Medium F had an adhesion promoting layer but did not include the physical networking component in that layer. This example had poor dark line performance which was believed to be due to heavy penetration of the adhesion promoting composition. Medium G included the waterproofing treatment, image-receiving layer, and the protectant layer, but excluded the adhesion promoting layer. This example had poor durability in the area of coin scratch and wrinkle durability. This was attributed to poor adhesion of the image-receiving layer and the protectant layer.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A fabric print medium, comprising:
a treated fabric base substrate comprising a fabric base substrate having a water proofing treatment including a water-repellant agent applied thereto;
an adhesion promoting layer applied directly adjacent to the treated fabric base substrate, the adhesion promoting layer comprising a first polymeric binder and a physical networking component; and an image-receiving layer applied to the adhesion promoting layer, the image-receiving layer comprising a second polymeric binder and a particulate filler.

2. The fabric print medium of claim 1, wherein the water-repellent agent comprises a fluorocarbon polymer, polyacrylate with perfluoro side chain, a polyvinylidene chloride emulsion, a polyolefin emulsion, a poly(ethylterephthalate) emulsion, an aqueous wax dispersion, a perfluorooctane sulfonate, a perfluorooctanoic acid, a paraffin wax, paraffin wax plus aluminum salt, paraffin wax plus chromium salt, a fatty acid, a hydrogen siloxane emulsion, or a combination thereof.

3. The fabric print medium of claim 1, wherein the treated fabric base substrate has a surface energy from 20 mN/m to 55 mN/m at 25° C.

4. The fabric print medium of claim 1, wherein the first polymeric binder of the adhesion promoting layer has a solids content from 0.1 wt % to 20 wt % and a viscosity from 5,000 cps to 30,000 cps as measured at 30 rpm, and wherein the second polymeric binder of the image-receiving layer has a weight average molecular weight from 5,000 Mw to 200,000 Mw.

5. The fabric print medium of claim 1, wherein the physical networking component comprises an acrylate copolymer, a polyethylene glycol copolymer, a polyurethane copolymer, an isophorone diisocyanate, or a combination thereof;
and wherein the physical networking component has a weight average molecular weight from 300,000 Mw to 1,000,000 Mw.

6. The fabric print medium of claim 1, wherein the particulate filler of the image-receiving layer comprises aluminum, aluminum hydroxide, aluminum silicate, alumina, colloidal alumina, barium sulfate, boehmite, psudoboehmite, calcium, calcium carbonate, calcium silicate, calcium sulfate, clay, diatomite, kaolin, lithopene, magnesium, magnesium carbonate, magnesium hydroxide, magnesium silicate, polystyrene, polymethacrylate, polyacrylate, polyolefin, polyethylene, polypropylene, satin white, silica, amorphous silica, synthetic amorphous silica, colloidal silica, talc, titanium dioxide, zinc, zinc oxide, zinc sulfide, zinc carbonate, zeolite, or a combination thereof.

7. The fabric print medium of claim 1, wherein the image-receiving layer further comprises a flame retardant including an organohalogenated compound, a halogen containing compound, a mineral compound, a metal oxide, a phosphorus containing compound, an organophosphate, a nitrogen containing compound, or a combination thereof; and
wherein the flame retardant comprises from 1 wt % to 50 wt % of the image receiving layer based on dry weight of the image receiving layer.

8. The fabric print medium of claim 1, further comprising a protectant layer applied to the image receiving layer, the protectant layer comprising a first crosslinked polymeric network and a second crosslinked polymeric network.

9. The fabric print medium of claim 8, wherein the first crosslinked polymeric network and the second crosslinked polymeric network in the protectant layer are different and independently comprise polyacrylate, polyurethane, vinylurethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, or a combination thereof.

10. The fabric print medium of claim 8, wherein the protectant layer further comprises from 1 wt % to 20 wt % of a wax.

11. The fabric print medium of claim 8, wherein the protectant layer further comprises a particulate filler, a flame retardant, or a combination thereof.

12. The fabric print medium of claim 1, wherein the first polymeric binder has an affinity to the water proofing treatment.

13. A method of manufacturing a fabric print medium, comprising:
treating a fabric base substrate with a water proofing treatment, wherein the water proofing treatment comprises a water-repellant agent;
applying an adhesion promoting layer directly adjacent to the treated fabric base substrate, the adhesion promoting layer comprising a first polymeric binder and a physical networking component; and
applying an image-receiving layer to the adhesion promoting layer, the image-receiving layer comprising a second polymeric binder and a particulate filler.

14. The method of manufacturing of claim 13, wherein treating the fabric base substrate with the water proofing treatment comprises:
dipping the fabric base substrate in the water proofing treatment to form a treated fabric base substrate, and
rolling the treated fabric base substrate between a pair of rollers having a pressure of 30 psi to 100 psi.

15. A printing method, comprising:
obtaining a fabric print medium comprising:
a treated fabric base substrate including a fabric base substrate and a water proofing treatment,
an adhesion promoting layer applied directly adjacent to the treated fabric base substrate, the adhesion promoting layer comprising a first polymeric binder and a physical networking component, and
an image-receiving layer applied to the adhesion promoting layer, the image-receiving layer comprising a second polymeric binder and a particulate filler; and
applying an ink composition onto the fabric print medium to a form a printed image thereon.

16. The printing method of claim 15, wherein providing the fabric print medium further comprises providing the fabric print medium which also includes a protectant layer applied to the image receiving layer, the protectant layer comprising a first crosslinked polymeric network and a second crosslinked polymeric network.

* * * * *